United States Patent
Ando et al.

(10) Patent No.: US 10,809,969 B2
(45) Date of Patent: *Oct. 20, 2020

(54) SYSTEMS AND METHODS FOR AUDIO PLAYBACK

(71) Applicant: SEMICONDUCTOR COMPONENTS INDUSTRIES, LLC, Phoenix, AZ (US)

(72) Inventors: Yoshihide Ando, Anpachi-Gun (JP); Hiroyuki Okita, Anpachi-Gun (JP)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/230,257

(22) Filed: Dec. 21, 2018

(65) Prior Publication Data

US 2019/0121607 A1 Apr. 25, 2019

Related U.S. Application Data

(63) Continuation of application No. 15/144,281, filed on May 2, 2016, now Pat. No. 10,191,715.

(Continued)

(51) Int. Cl.
*G06F 17/00* (2019.01)
*G06F 3/16* (2006.01)
(Continued)

(52) U.S. Cl.
CPC ............ *G06F 3/165* (2013.01); *H04R 27/00* (2013.01); *H04R 5/033* (2013.01); *H04R 2227/003* (2013.01); *H04R 2420/07* (2013.01)

(58) Field of Classification Search
CPC ..... G06F 3/165; H04R 2420/07; H04R 27/00; H04R 3/04; H04R 3/12
See application file for complete search history.

(56) References Cited

U.S. PATENT DOCUMENTS 7,805,210 B2    9/2010  Cucos et al.
2008/0153556 A1  6/2008  Oh
(Continued)

FOREIGN PATENT DOCUMENTS

CN    103209269 A    7/2013
CN    104320843 A    1/2015
(Continued)

*Primary Examiner* — Joseph Saunders, Jr.
(74) *Attorney, Agent, or Firm* — Adam R. Stephenson, LTD.

(57) ABSTRACT

Implementations of a method of synchronizing audio playback may include, using a correction block and a second sample counter, comparing a number of playback samples in a slave channel stream with a number of master playback samples in a master channel stream received from a wireless telecommunication channel from a first audio speaker device. The method may include adjusting an input transfer rate of playback samples into an ASRC if the number of playback samples in the slave channel stream and the number of master playback samples is not the same, keeping an output transfer rate of playback samples of the slave channel stream out of the ASRC to a slave DAC at a constant value, and, through adjusting the input transfer rate into the ASRC, synchronizing the playback of audio data included in the slave channels stream with the playback of audio data included in the master channel stream.

19 Claims, 14 Drawing Sheets

Related U.S. Application Data

(60) Provisional application No. 62/313,539, filed on Mar. 25, 2016.

(51) Int. Cl.
*H04R 27/00* (2006.01)
*H04R 5/033* (2006.01)

(56) References Cited

U.S. PATENT DOCUMENTS

| | | |
|---|---|---|
| 2009/0204843 A1 | 8/2009 | Celinski et al. |
| 2009/0274326 A1 | 11/2009 | Jia et al. |
| 2009/0298420 A1 | 12/2009 | Haartsen et al. |
| 2012/0058727 A1 | 3/2012 | Cook et al. |
| 2016/0098244 A1 | 4/2016 | Hsieh et al. |
| 2017/0098466 A1 | 4/2017 | Elliot et al. |

FOREIGN PATENT DOCUMENTS

| | | |
|---|---|---|
| JP | 2007013707 A | 1/2007 |
| JP | 2013153312 A | 8/2013 |

SYSTEMS AND METHODS FOR AUDIO PLAYBACK

CROSS REFERENCE TO RELATED APPLICATIONS

This application is a continuation application of the earlier U.S. Utility Patent Application to Yoshihide Ando entitled "Systems and Methods for Audio Playback," application Ser. No. 15/144,281, filed May 2, 2016, now pending, which application claims the benefit of the filing date of U.S. Provisional Patent Application Ser. No. 62/313,539 titled "Systems and Methods for Audio Playback" to Yoshihide Ando, filed Mar. 25, 2016, the disclosures of each of which are hereby incorporated entirely herein by reference.

BACKGROUND

1. Technical Field

Aspects of this document relate generally to systems and method for playing back stored and live audio data.

2. Background

Audio playback devices are used to allow individuals to listen to audio information at various locations. For example, headphones allow a user to listen to audio information without disturbing others. The speakers in the headphones are electrically connected to an audio playback device, such as a portable radio or MP3 player, and play audio data stored in the audio playback device.

SUMMARY

Implementations of a method of synchronizing audio playback may include: generating a master channel stream using a processor and a memory of a first audio speaker device where the master channel stream includes a plurality of playback samples and sending the master channel stream into a wireless telecommunication channel using a wireless module coupled with the processor and the memory. The method may include receiving the master channel stream from the wireless telecommunication channel using a wireless module associated with a second audio speaker device and generating a slave channel stream using the master channel stream and a processor and a memory included in the second audio speaker device where the slave channel includes a plurality of playback samples. The method may also include generating a receiving a synchronous trigger signal using the first audio speaker device, sending the synchronous trigger signal into the wireless telecommunication channel using the wireless module of the first audio speaker device, and receiving the synchronous trigger signal from the wireless telecommunication channel using the wireless module of the second audio speaker device. The method may include identifying a number of master playback samples sent to a master digital-to-analog (DAC) converter in the master channel stream and sending the number of master playback samples in the master channel stream into the wireless telecommunication channel using the wireless module of the first audio speaker device. The method may also include, in response to receiving the synchronous trigger signal using the wireless module of the first audio speaker device, identifying a number of playback samples sent to a slave DAC converter in the slave channel stream and comparing a number of playback samples with the number of master playback samples received from the wireless telecommunication channel. The method may include, using an asynchronous sampling rate converter (ASRC), adjusting an input transfer rate of playback samples into the ASRC if the number of playback samples in the slave channel stream and the number of master playback samples in the master channel stream is not the same.

Implementations of methods of synchronizing audio playback may include one, all, or any of the following:

Adjusting the input transfer rate of playback samples into the ASRC may further include increasing the input transfer rate if the number of playback samples is less than the number of master playback samples.

Adjusting the input transfer rate of playback samples into the ASRC may further include decreasing the input transfer rate if the number of playback samples is more than the number of master playback samples.

The method may further include keeping an output transfer rate of playback samples out of the ASRC to the slave DAC at a constant value.

The method may further include using a filter to maintain a quality of audio data included in the playback samples of the slave channel stream.

The method may further include using a delay block included in the first audio speaker device to adjust an input transfer rate of playback samples to a master DAC included in the first audio speaker device to assist in time synchronizing the playback of audio data included in the master channel stream with the playback of audio data included in the slave channel stream.

The method may include adjusting the input transfer rate of playback samples into the ASRC to time synchronize the playback of audio data included in the slave channel stream with the playback of audio data included in the master channel stream.

Implementations of a system for synchronized audio playback may include an audio playback device including a processor and a memory, where the memory included audio data and the processor and memory are configured to process the audio data to generate an audio stream including audio data. The system may include a wireless module coupled with the audio playback device where the wireless module is configured to receive the audio stream and send it into a wireless telecommunication channel. A wireless module may be coupled with a first audio speaker device and configured to receive the audio stream from the wireless telecommunication channel. The first audio speaker device may include a processor and a memory configured to generate a master channel stream including a plurality of playback samples using the audio stream and to transmit the master channel stream in to the wireless telecommunication channel using the wireless module. The system may include a wireless module coupled with a second audio speaker device configured to receive the master channel stream from the wireless telecommunication channel. The second audio speaker device may include a processor and a memory configured to generate a slave channel stream including a plurality of playback samples using the master channel stream. The first audio speaker device may further include a master sample counter configured to identify a number of master playback samples of the plurality of playback samples of the master channel stream received by a DAC coupled with the processor and the memory. The second audio speaker device may further include a second sample counter coupled with the processor and the memory which is configured to identify a number of playback samples of the plurality of playback samples of the slave channel stream received by an ASRC coupled with the processor and the memory. In response to receiving a synchronous trigger signal sent by the first audio speaker device from the wireless telecommunication channel using the wireless module, the second audio speaker device may be configured to compare the number of playback samples with the number of master playback samples and, if the number of playback samples and number of master playback samples are not the same, using the ASRC, adjust an input transfer rate of playback samples into the ASRC.

Implementations of systems for synchronized audio playback may include one, all, or any of the following:

A slave DAC may be included and may be coupled with the ASRC where an output transfer rate of playback samples out of the ASRC to the slave DAC is a constant value.

Adjusting the input transfer rate of playback samples into the ASRC may further include increasing the input transfer rate if the number of playback samples of the slave channel stream is less than the number of master playback samples.

Adjusting the input transfer rate of playback samples into the ASRC may further include decreasing the input transfer rate if the number of playback samples of the slave channel stream is more than the number of master playback samples.

The system may further include a correction block coupled with the ASRC and with the second sample counter where the correction block is configured to calculate an adjusted input sampling frequency for the ASRC.

The first audio speaker device may further include a delay block configured to adjust an input transfer rate of playback samples to a master DAC included in the first audio speaker device to assist in time synchronizing the playback of audio data included in the master channel stream with the playback of audio data included in the slave channel stream.

Adjusting the input transfer rate of playback samples into the ASRC time synchronizes the playback of audio data included in the slave channel stream with the playback of audio data included in the master channel stream.

Implementations of a method of synchronizing audio playback may include using a correction block and a second sample counter, comparing a number of playback samples in a slave channel stream of a second audio speaker device with a number of master playback samples in a master channel stream received from a wireless telecommunication channel from a first audio speaker device. The method may also include, using an ASRC, adjusting an input transfer rate of playback samples into the ASRC if the number of playback samples in the slave channel stream and the number of master playback samples is not the same. The method may include keeping an output transfer rate of playback samples of the slave channel stream out of the ASRC to a slave DAC at a constant value, and, through adjusting the input transfer rate into the ASRC, synchronizing the playback of audio data included in the slave channels stream with the playback of audio data included in the master channel stream.

Implementations of the method of synchronizing audio playback may include one, all, or any of the following:

The method may further include filtering to maintain a quality of the audio data included in the slave channel stream and filtering to maintain a quality of the audio data included in the master channel stream.

The method may further include using a delay block included in the first audio speaker device to adjust an input transfer rate of playback samples to a master DAC included in the first audio speaker device to assist in time synchronizing the playback of audio data included in the master channel stream with the playback of audio data included in the slave channel stream.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended systems and/or methods for synchronizing audio playback will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such systems, methods, and implementing components and methods, consistent with the intended operation and methods.

The various system and method implementations described herein are used to provided time synchronous (synchronized) playback of audio data on audio systems that include multiple playback channels. Examples of such systems include a pair of headphones, a surround sound system with multiple speakers, a car audio system with multiple speakers, and other multi-speaker sound playback systems. As in the various systems, the channels may not all be physically connected (i.e., using wires) but may be wirelessly coupled together.

Figure 1:
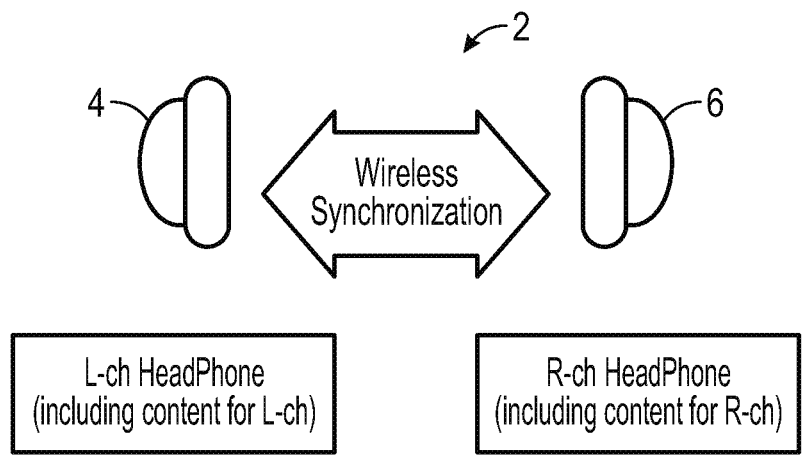
FIG. 1 is a front view of an implementation of a pair of wireless headphones.

Referring to FIG. 1, an implementation of a pair of wireless headphones 2 is illustrated. In this implementation, a master headphone (L-ch HeadPhone) 4 and a slave headphone (R-ch HeadPhone) 6 are illustrated wirelessly coupled together. In these implementations, audio data/content is received wirelessly by each headphone. In some implementations, the audio data may be received independently by each headphone from an audio playback device using a different receiving channel; in other implementations, the audio data may be received by the master headphone and then wirelessly transmitted to the slave headphone by the master headphone. In some implementations, the audio data used may be stored in each headphone prior to playback.

The master headphone may be a first audio speaker device that includes a memory and processor operatively coupled together and coupled with a wireless module that contains a radio and other components needed to send and receive audio data using one or more wireless telecommunication channels. Likewise, the slave headphone may be a second audio speaker device that also includes a memory and a processor operatively coupled together and which are coupled with a wireless module containing a radio and other components that are capable of sending a receiving audio data using the one or more wireless telecommunication channels available. Each of the master headphone and the slave headphone use various circuit components, including oscillator circuits or clock circuits which are used in processing the received audio data and in playing back the received audio data a particular playback speeds. Because the oscillator circuits or clock circuits of each headphone are made of physically different circuit components, it is very likely that the actual frequency of each oscillator/clock do not precisely correspond. Because of this, the speed of playback of audio data in each channel from each headphone will differ from the other. Since both headphones are listened to simultaneously by the user, the difference in playback speed in each channel may become perceptible to the user during playback, particularly as playback progresses. Various system and method implementations disclosed herein work to time synchronize the audio playback notwithstanding the differences in playback speed caused by the differences in oscillators/clocks and other systemic causes.

Figure 2:
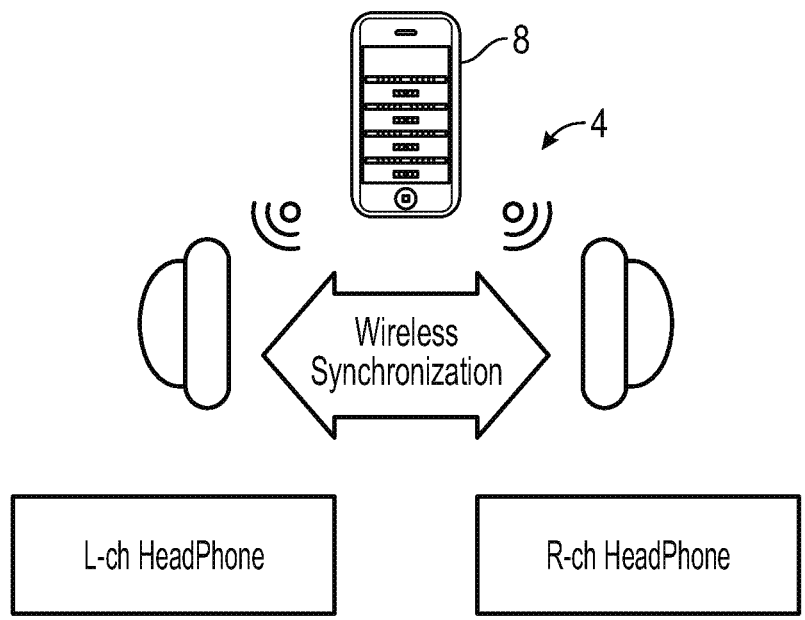
FIG. 2 is a front view of an implementation of a pair of wireless headphones wirelessly connected with an audio playback device through a wireless telecommunication channel.
Figure 3:
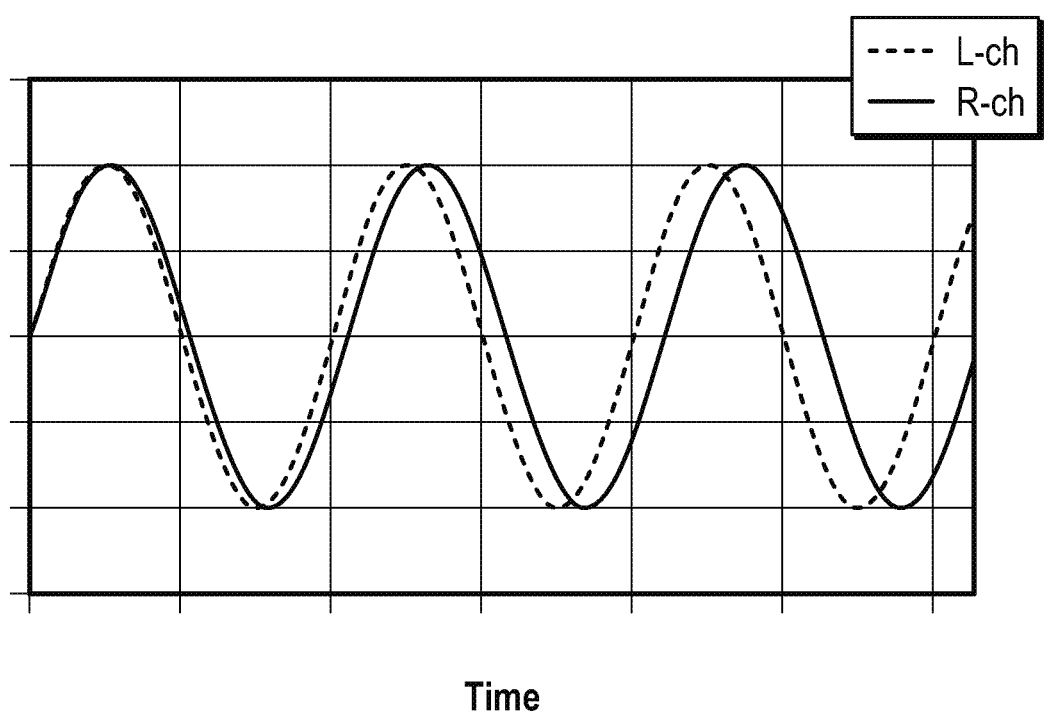
FIG. 3 is a time frequency view of a graph of audio data being played back in a left headphone and a graph of audio data being played back in a right headphone showing how the data is not synchronized in time.

Referring to FIG. 2, another implementation of a pair of wireless headphones is illustrated that is wirelessly connected with an audio playback device through a wireless telecommunication channel. In various system and method implementations disclosed herein, the audio playback device may serve to provide audio data/content, and, in particular implementations, it may assist to perform time synchronization between the two headphones or may simply provide content to one or both of the headphones and rely on the headphones to make the needed synchronization happen. Referring to FIG. 3, a time frequency view of a graph of audio data being played back in a left headphone (L-ch) and a right headphone (R-ch) is illustrated, showing how, while the playback begins at the same point at the beginning of the graph, by the end of the graph, the playback of the left headphone is behind the playback of the right headphone.

Figure 4:
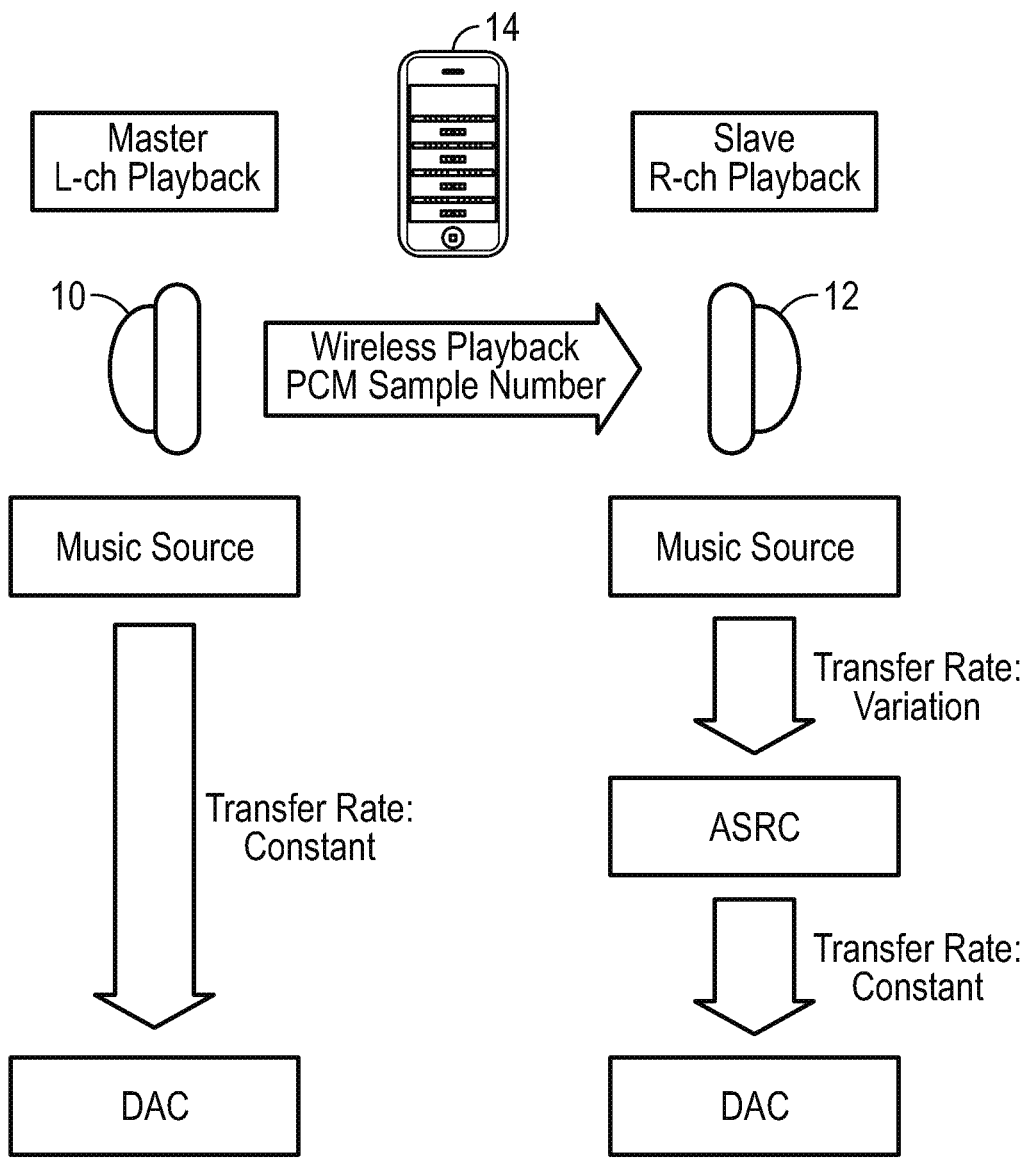
FIG. 4 is a block diagram view of a master headphone and slave headphone showing an overview of the process components and variables used in time synchronizing the audio data played back in the master headphone and the slave headphone.

Referring to FIG. 4, a block diagram view of a master headphone 10 and a slave headphone 12 in wireless communication with an audio playback device 14 is illustrated. Within each headphone 10, 12 is a music source, which includes audio data received from the audio playback device 14 and stored in memory in each headphone 12. The audio data is transferred from the memory in the form of a plurality of playback samples. The playback samples in various implementations may be pulse-code modulated (PCM) and the number of the samples played back may be counted and identified by a processor within each headphone 10, 12. As each headphone drives one or more speakers included in the structure of the headphone, the digital audio data needs to be converted to an analog signal used to drive the speaker. Accordingly, a digital-to-analog converter (DAC) is included in each headphone 10, 12 and is used to take the plurality of playback samples and convert them to a corresponding analog audio signal. As illustrated, for the master headphone 10, the master channel uses a constant transfer rate of playback samples to the DAC. On the slave channel side, the slave headphone 12 includes an asynchronous sampling rate converter (ASRC) which receives the playback samples from the music source and sends playback samples to the DAC. The ASRC is capable of varying the input transfer rate of playback samples, while keeping the output transfer rate of samples constant to the DAC.

During operation, the master channel 10 sends the current PCM sample number of the playback sample sent to the DAC to the slave channel 12. This is generally done wirelessly using the wireless modules in each channel 10, 12. The processor of the slave channel then compares the PCM sample number received with the PCM sample number just sent to the DAC. If the PCM sample numbers are the same, the two channels are time synchronized. If they differ, then the ASRC adjusts the input transfer rate of playback samples to realign the PCM sample numbers. If the slave PCM sample number is lower than the master PCM sample number, then the slave channel is behind, and the ASRC increases the input transfer rate to catch the slave channel up. In various implementations, the ASRC will also perform sampling rate conversion during this process. In various implementations, audio filters associated with the ASRC may be used to ensure that during adjustment, the audio quality is maintained. If the slave PCM sample number is higher than the master PCM sample number, then the slave channel is ahead, and the ASRC will slow down the input transfer rate and, in various implementations, perform sampling rate conversion. In both situations, the output transfer rate to the DAC remains constant and unchanged. Through the use of the ASRC, the playback of the audio data will be time synchronized even though the oscillators/clocks used in each channel differ in frequency.

Figure 5:
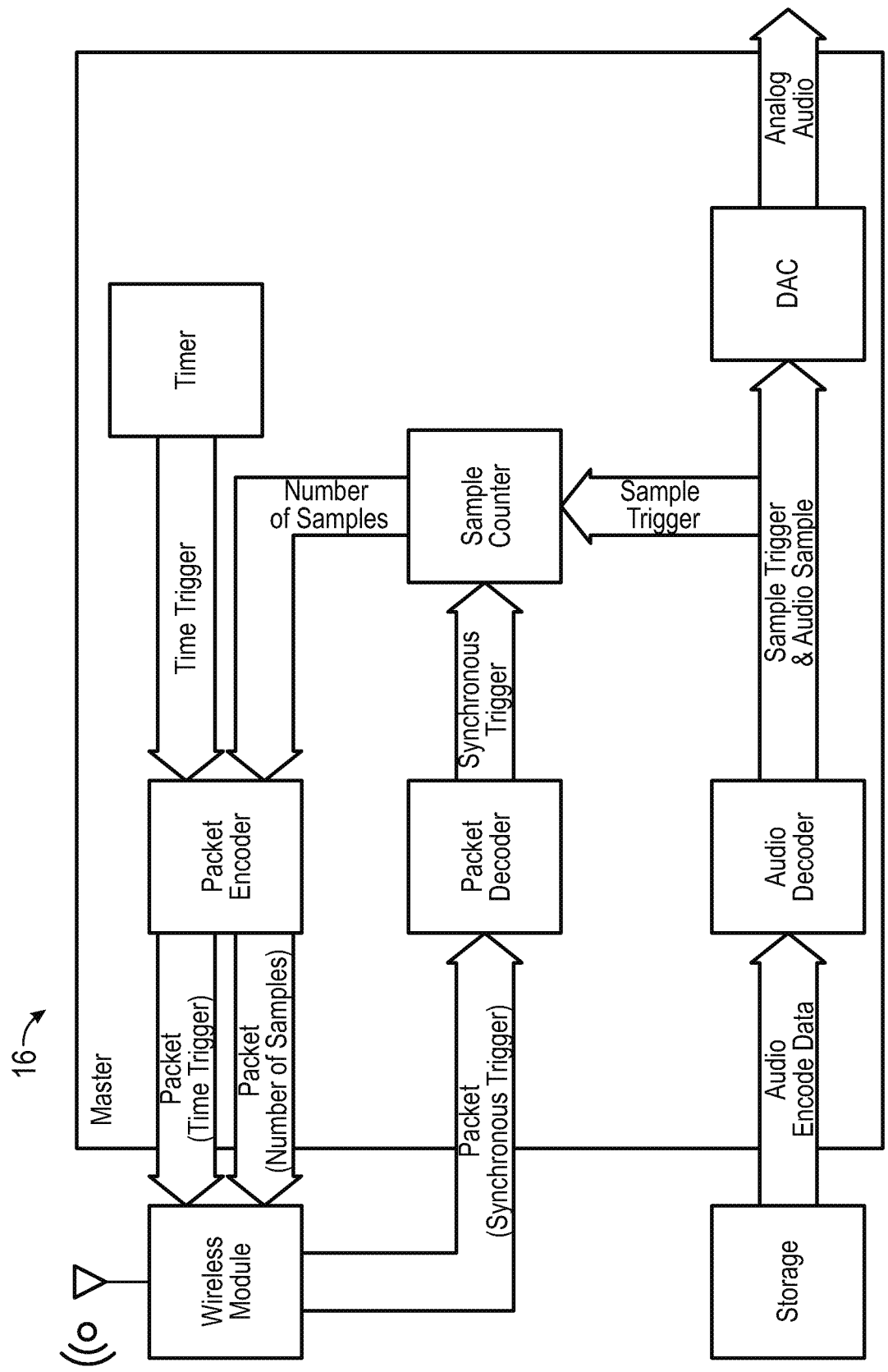
FIG. 5 is a block diagram view of the components of an implementation of a first audio speaker device (master device)
Figure 6:
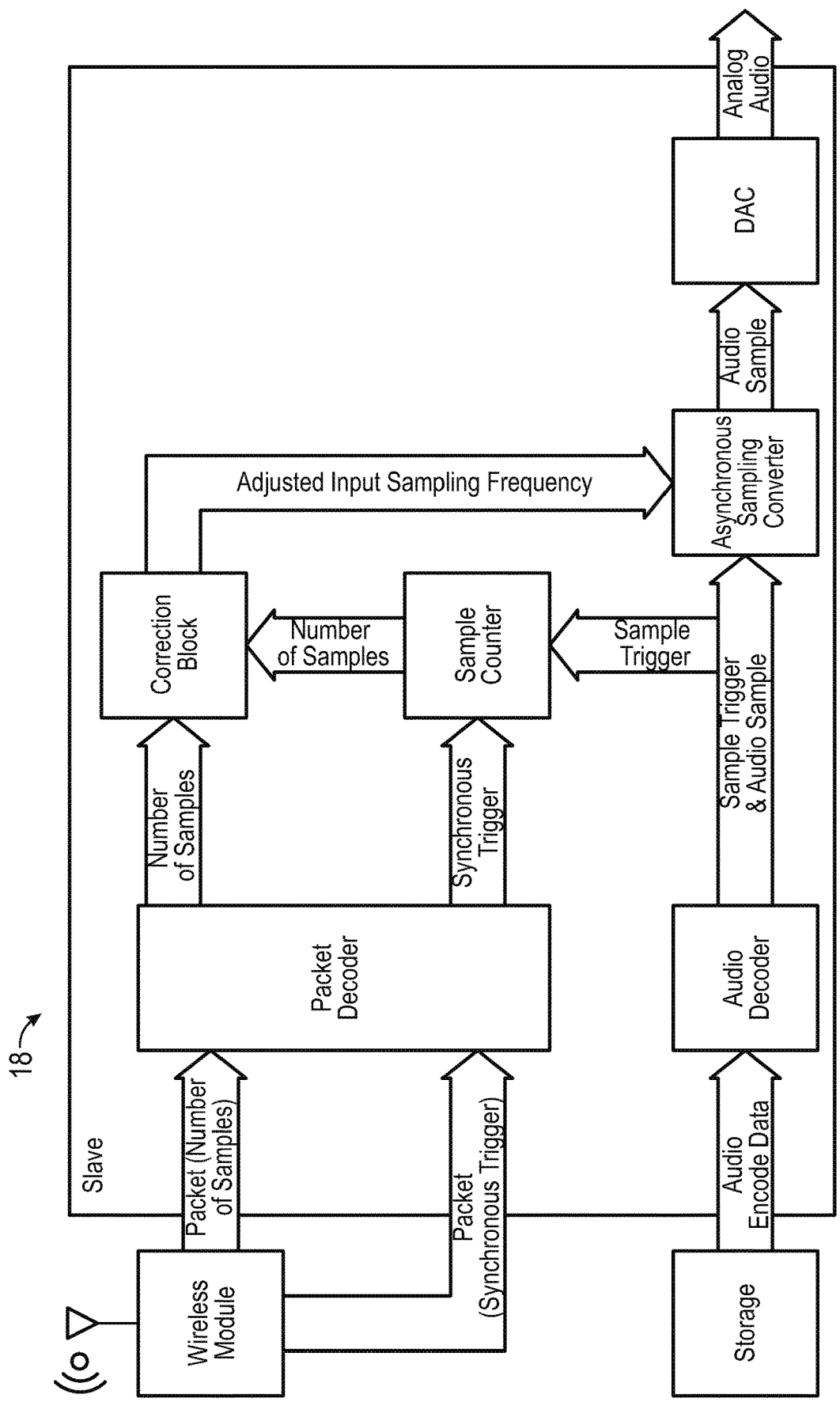
FIG. 6 is a block diagram view of the components of an implementation of a second audio speaker device (slave device)

Referring to FIG. 5 a block diagram of an implementation of a master channel 16 is illustrated. Referring to FIG. 6, a block diagram of an implementation of a slave channel 18 is illustrated. In both the master channel 16 and slave channel 18 implementations, audio data is included in an audio storage component. This storage component may be a memory associated with the master channel 16 and slave channel 18. In such implementations, because the audio data is stored prior to playback, the audio data may not be streamed during playback to the master channel 16 and slave channel 18, but transferred or otherwise stored prior to playback. The audio data in the storage may be encoded audio data, which may be compressed, or otherwise formatted. During playback, the encoded audio data is transferred from the storage in each channel 16, 18 and processed by an audio decoder. In various implementations, the audio decoder may decompress the audio data. The audio decoder for each channel outputs a plurality of playback samples for the master channel 16 and for the slave channel 18. Along with the playback samples, the audio decoder may output a sample trigger which is used by the DAC for each channel 16, 18 to tell the DAC when a particular playback sample should be used by the DAC to construct the corresponding analog audio signal. The sample trigger may correspond with a particular sampling rate that may, in various implementations, vary according to the audio content/data being transferred, and the audio samples may be output by the Audio Decoder at the same rate. For example, in various implementations, the sampling frequency may be 44.1 kHz, or other conventional digital audio sampling frequencies.

As illustrated in FIGS. 5 and 6, the master channel 16 includes a Timer, which generates a time trigger. The period of time between when each time trigger signal may be generated is predetermined, and may vary from implementation to implementation. In particular implementations, the time period is about 1 minute. This time period may also be calculated as a function of the difference between the oscillation frequencies between the master channel 16 and the slave channel 18 in various implementations. The time trigger is sent to a packet encoder, which includes the information regarding the time trigger into a data packet which is then routed to the wireless module of the master channel 16. In various implementations, this may be referred to as a request to time synchronize the channels. The wireless module then sends the packet containing the time trigger into the telecommunication channel where it is received by the Wireless Module of the slave channel 18 (or directly or indirectly via another device to any other number of Wireless Modules associated with one or more slave channels). The packet is then routed as a synchronous trigger and sent to a Packet Decoder in the slave channel 18. The Packet Decoder then sends the synchronous trigger to a Sample Counter coupled with the Audio Decoder. The Sample Counter counts the number of samples output by the Audio Decoder. In various implementations, the Sample Counter may store just the current sample number, or may store the total number of samples. A bit width of the Sample Counter in both the channels 16, 18 may be secured so that no overflow occurs. When playback begins, the Sample Counter may be reset to zero. When the synchronous trigger is received by the Sample Counter, the Sample Counter then sends the current number of playback samples (slave playback samples) output by the Audio Decoder to a Correction Block.

At the same time the Timer generated a time trigger, the Sample Counter of the master channel 18 output the current number of playback samples (master playback samples) output by the Audio Decoder of the master channel. This number of samples is then sent to the Packet Encoder of the master channel where it is included in a packet sent to the Wireless Module of the master channel which then sends the packet wireless to the Wireless Module of the slave channel 18. The packet containing the number of master playback samples is then processed by the Packet Decoder of the slave channel 18 which then provides the number of master playback samples to the Correction Block. The Correction Block then takes the number of slave playback samples and compares it with the number of master playback samples it received. Based on the comparison, the Correction Block either calculates an adjusted input sampling frequency and routes it to the ASRC or sends a signal to the ASRC with information needed for the ASRC to calculate the adjusted input sampling frequency. Using this information/frequency, the ASRC then adjusts the input sampling frequency (if needed) as previously disclosed to ensure that the audio samples being provided at a constant rate to the DAC of the slave channel 18 are time synchronized with the audio samples being provided to the DAC of the master channel 16. In various implementations, the adjustment may be represented as a number of extra samples required for the slave channel 18 to catch up or the number of samples needing to be eliminated from the slave channel 18 to time synchronize the channels. In various implementations, the Correction Block and/or ASRC may take into account in their calculations various delays, such as, by non-limiting example, network delays due to the distance separating the master channel 20 and the slave channel 22, the processing speed of the various components in the channels, and other parameters of the channels that potentially affect the time synchronization of the audio playback between the two channels.

Figure 7:
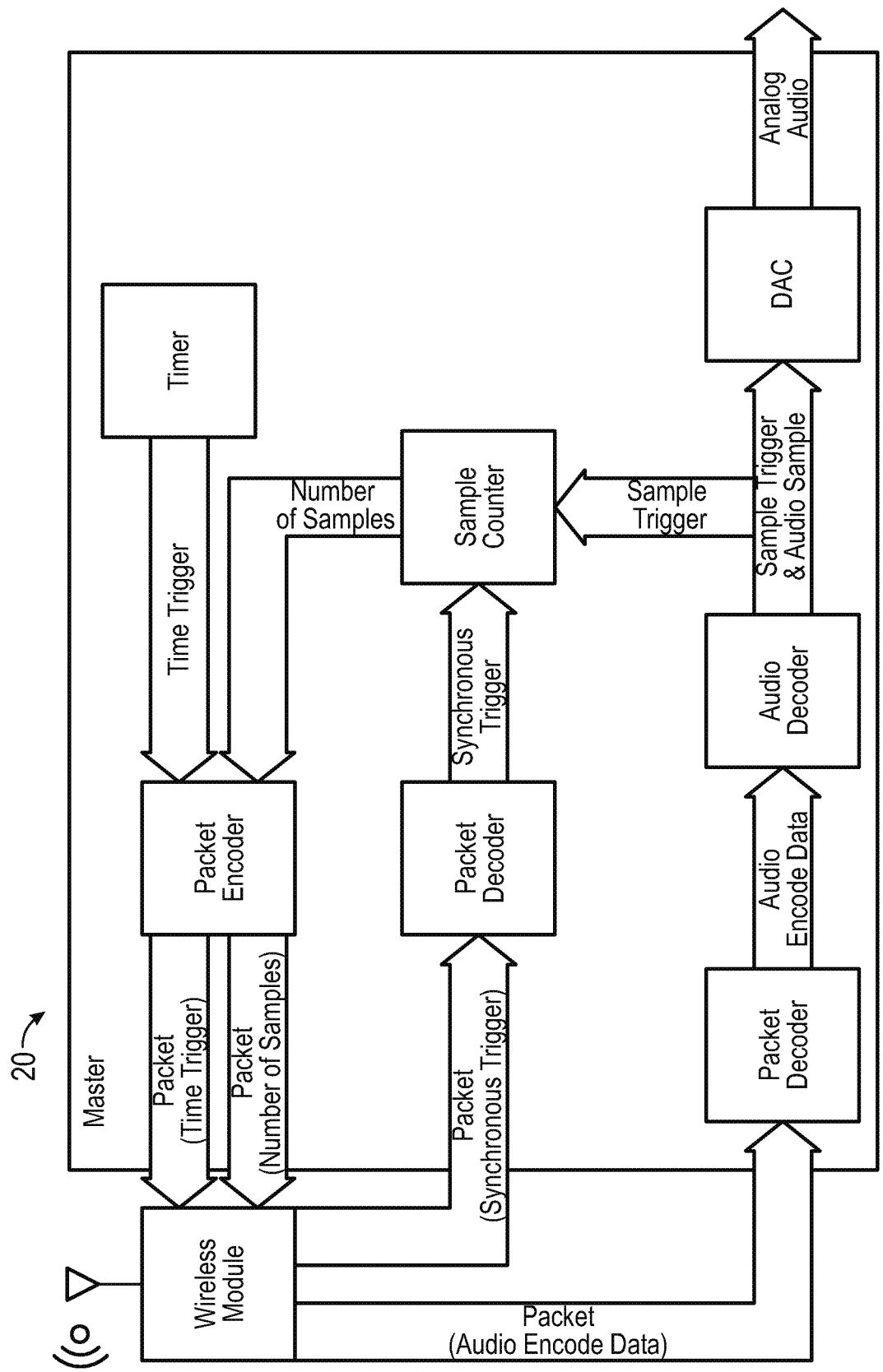
FIG. 7 is a block diagram view of the components of another implementation of a first audio speaker device showing the use of a synchronous trigger.
Figure 8:
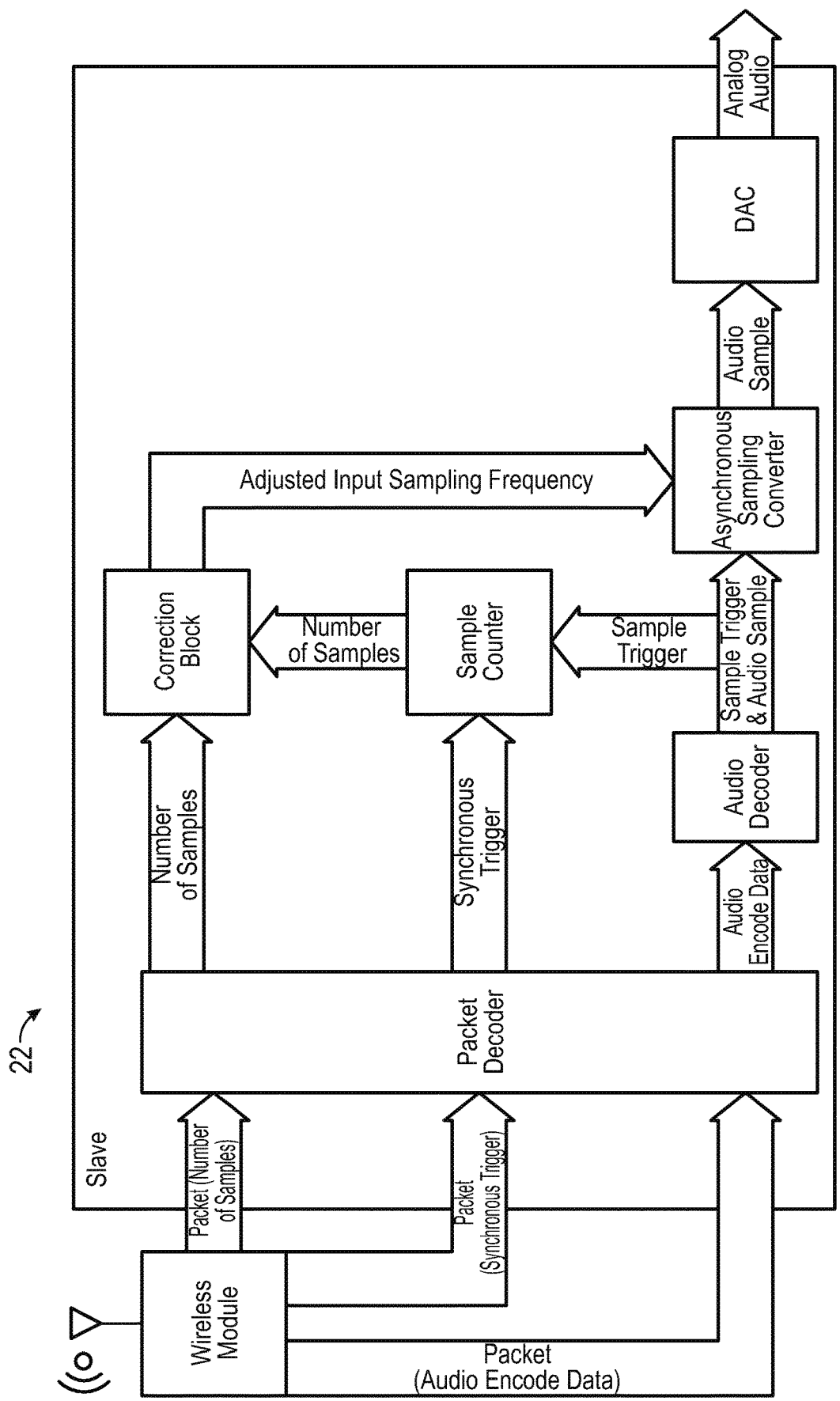
FIG. 8 is a block diagram of the components of another implementation of a second audio speaker device showing the use of a synchronous trigger.

Referring to FIG. 7, another implementation of a master channel 20 is illustrated. Referring to FIG. 8, another implementation of a slave channel 22 is illustrated. As illustrated in FIGS. 7 and 8, the source of the audio data for each channel is now data packets received by the respective Wireless Modules that includes audio encoded data which are then sent to a Packet Decoder in each channel 20, 22 before being sent to the Audio Decoder. This contrasts with the implementations of FIGS. 5 and 6, where the audio data was stored. However, the function of the implementations of FIGS. 7 and 8 with respect to time synchronization of the audio data received is similar to that disclosed with respect to the implementations of FIGS. 5 and 6, as can be seen by inspection. The difference is how the audio data is received by the master channel 20 and the slave channel 22. In these implementations, the Packet Decoders in each channel may output a plurality of audio playback samples to the Audio Decoder. By non-limiting example, the audio content received by the Packet Decoder may be in an MP3 format, which may include approximately 1000 PCM playback samples in a single frame (1024 PCM data samples).

In all implementations disclosed herein, if the audio content is fast forwarded, rewound, restarted, or played from a position other than the beginning of the particular audio content, the system may be designed to ensure that playback starts in the master channel and all slave channels at the same sample position. By non-limiting example, if the audio content was fast forwarded by one second, then the system could ensure that the master channel and the slave channel start at the same PCM sample position by starting on the 45$^{th}$ frame (44*1024=45056 PCM samples, or just over 1 second of audio content).

Figure 9:
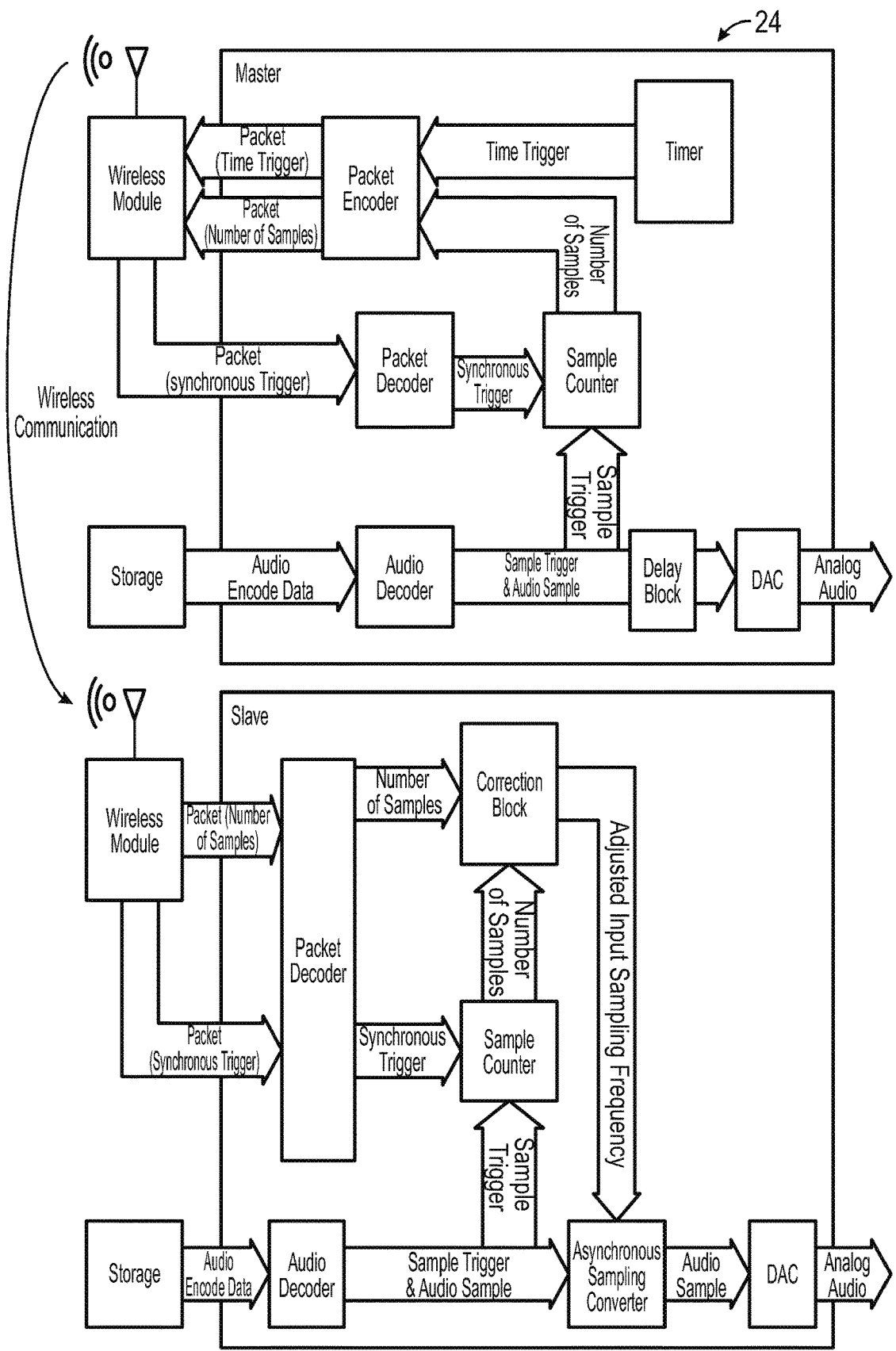
FIG. 9 is a block diagram of the components of another implementation of a first audio speaker device and another implementation of a second audio speaker device wirelessly coupled together through a wireless telecommunication channel.

Referring to FIG. 9, another implementation of a master channel 24 and an implementation of a slave channel 26 in wireless communication are illustrated. In the implementation of the master channel 24, a Delay Block between the Audio Decoder and the DAC has been added. The Delay Block functions to alter the transfer rate of master playback samples between the Audio Decoder and the DAC. In some situations, where the master channel 24 has received a notification from the slave channel 26 that the master channel 24 is ahead in playback of the slave channel 26, the Delay Block functions to slow the transfer rate of master playback samples through, by non-limiting example, skipping samples, dropping samples, or otherwise buffering them for later transmission to the DAC. In other situations, the Delay Block functions to speed the transfer rate of master playback samples through, by non-limiting example, interpolating samples, duplicating specific samples, or emptying a calculated quantity of a buffer of samples stored in the Delay Block to the DAC at a higher rate. In the master channel 24 and slave channel 26 implementations of FIG. 9, the combination of the Delay Block in the master channel 24 and the ASRC in the slave channel 26 may allow the system to more rapidly time synchronize the audio playback and/or provide greater control and/or less perceivable disruption of the playback to the user.

Figure 10:
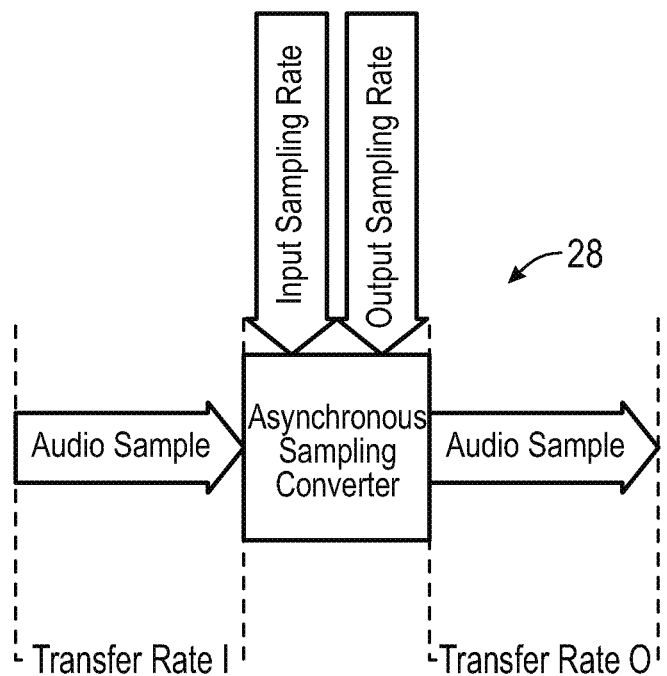
FIG. 10 is a block diagram of the components of an asynchronous sampling rate converter (ASRC)
Figure 11:
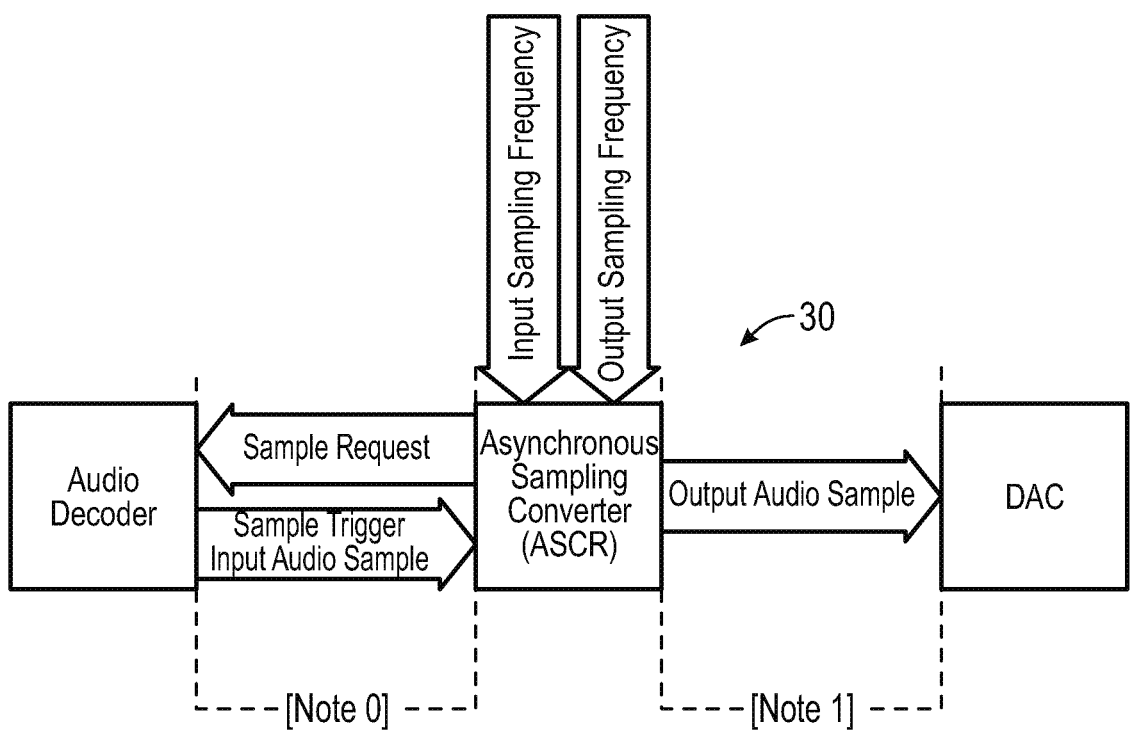
FIG. 11 is a block diagram of the ASRC of FIG. 10 coupled to an audio decoder and a digital-to-analog converter (DAC)

Referring to FIG. 10, an implementation of an ASRC 28 is illustrated. In this implementation, the ASRC 28 receives as inputs audio playback samples at a transfer rate I, an input sampling rate and an output sampling rate and then produces as an output an audio sample at a transfer rate O. In this implementation, the control parameter of the ASRC 28 from the Correction Block would be changes in and/or the input sampling rate/frequency. Referring to FIG. 11, another implementation of an ASRC 30 is illustrated. In this implementation, the inputs to the ASRC 30 are an input sample frequency and an output sampling frequency. With this information, the ASRC 30 then generates sample requests to the Audio Decoder at the frequency of the input sample frequency and also generates output audio samples at the frequency of the output sampling frequency. In response to receiving one or more sample requests, the Audio Decoder sends input audio samples along with sample trigger information as previously described. In various implementations, the adjusted input sampling frequency may be referred to as a FSI. In these implementations, the FSI may be a signal operating at a frequency determined by the Correction Block, data representing a calculated frequency, etc. For example, the sampling rate of the audio content may be 44.1 kHz and the default sampling frequency of the master channel 16 and the slave channel 18 may also be 44.1 kHz. If no change is necessary, then no frequency adjustment is needed and the FSI may be set and/or remain at 44.1 kHz. In some implementations, fixed group delay of audio samples may be accomplished by sampling rate conversion.

As illustrated, the master channel 16 may also be designed to receive a packet containing a synchronous trigger and use a Packet Decoder to retrieve the trigger signal and forward it to the Sample Counter of the Master Channel. In response, the Sample Counter outputs the current number of master channel samples output by the Audio Decoder. In this way, in various implementations, the master channel 16 may be configured to allow the slave channel 18 to send synchronous trigger signals asking for the current number of master channel samples so that number can be sent via the Wireless Module to the slave channel 18.

In various implementations, the ASRC may facilitate the speeding up or slowing down of the slave channel devices. The ASRC receives audio playback samples and a sample trigger from the Audio Decoder, along with an adjustment to the sampling frequency and/or FSI and/or sampling frequency out (FSO). In various implementations, the ASRC may output the audio samples as the frequency of the FSO based on the FSO. The output of audio samples to the DAC by the ASRC may, in various implementations, be based on the sample trigger from the Audio Decoder, the frequency adjustment/FSI from the Correction Block, a the FSO, or any combination thereof. In particular implementations, as illustrated in FIG. 11, the ASRC may output a sample request signal to the Audio Decoder at the frequency of the FSI. In response, the Audio Decoder outputs audio samples and sample trigger information to the ASRC 30 at the frequency of the FSI received from the ASRC. The FSI is, accordingly, depending on the sample trigger. The ASRC may then process a number of audio samples equal to the FSI every second. In various implementations, as previously discussed, the ASRC may include a memory, a buffer, or a similar structure used to store audio playback samples before they are output at the output sampling rate/frequency.

The ASRC then outputs the audio playback samples to the DAC as it receives from the Audio Decoder, i.e., at the sample trigger rate. For example, the ASRC may output the audio sample at a target frequency such as 44.1 kHz. In various implementations, the ASRC may perform sampling rate conversion of the received audio samples and may output the audio samples after conversion at the output sampling frequency. In the various implementations, the output sampling frequency from the ASRC is a constant rate.

Figure 12:
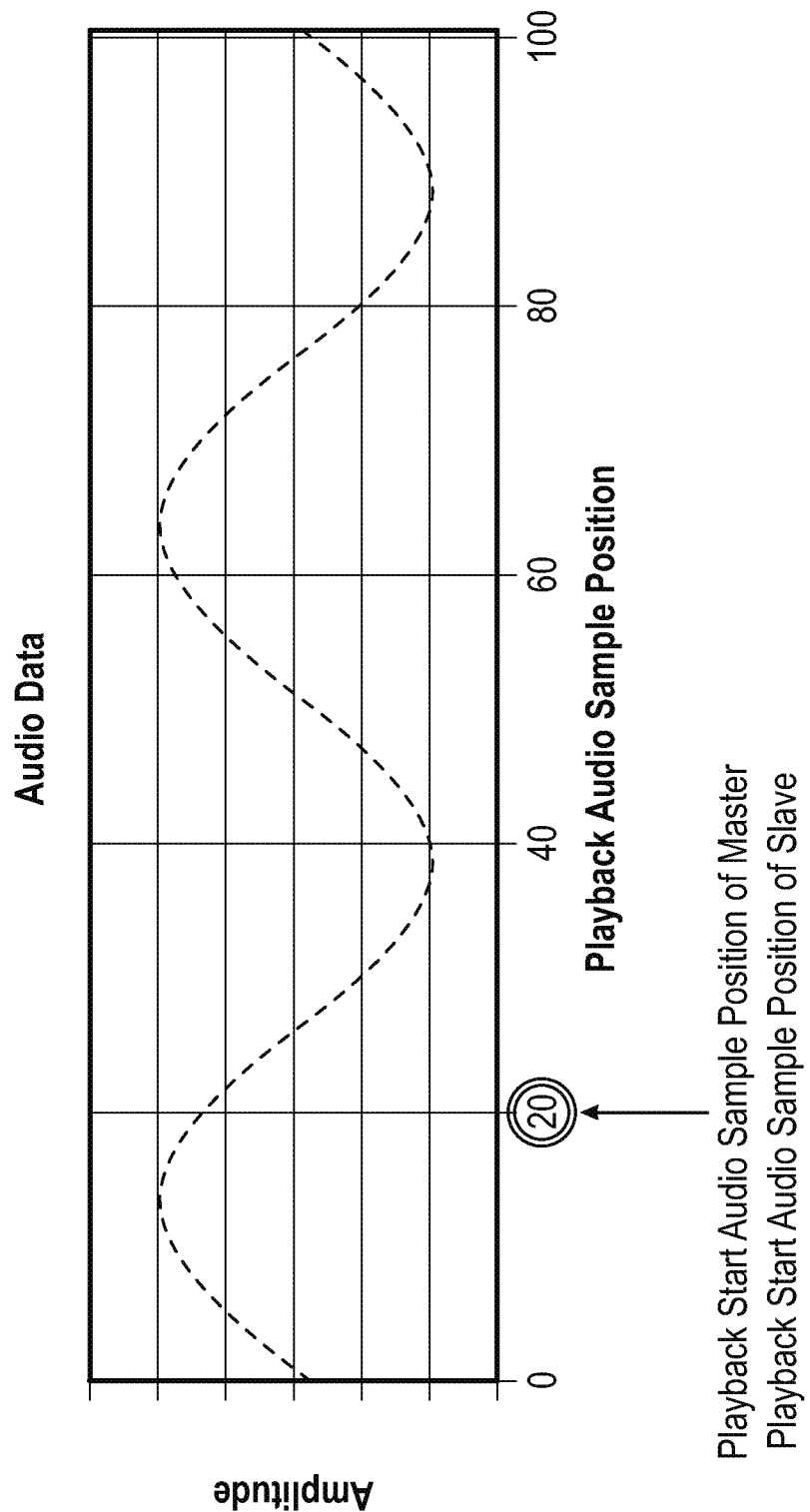
FIG. 12 is a time plot of audio data being played back by a master device and a slave device showing how the audio data is time synchronized.
Figure 13:
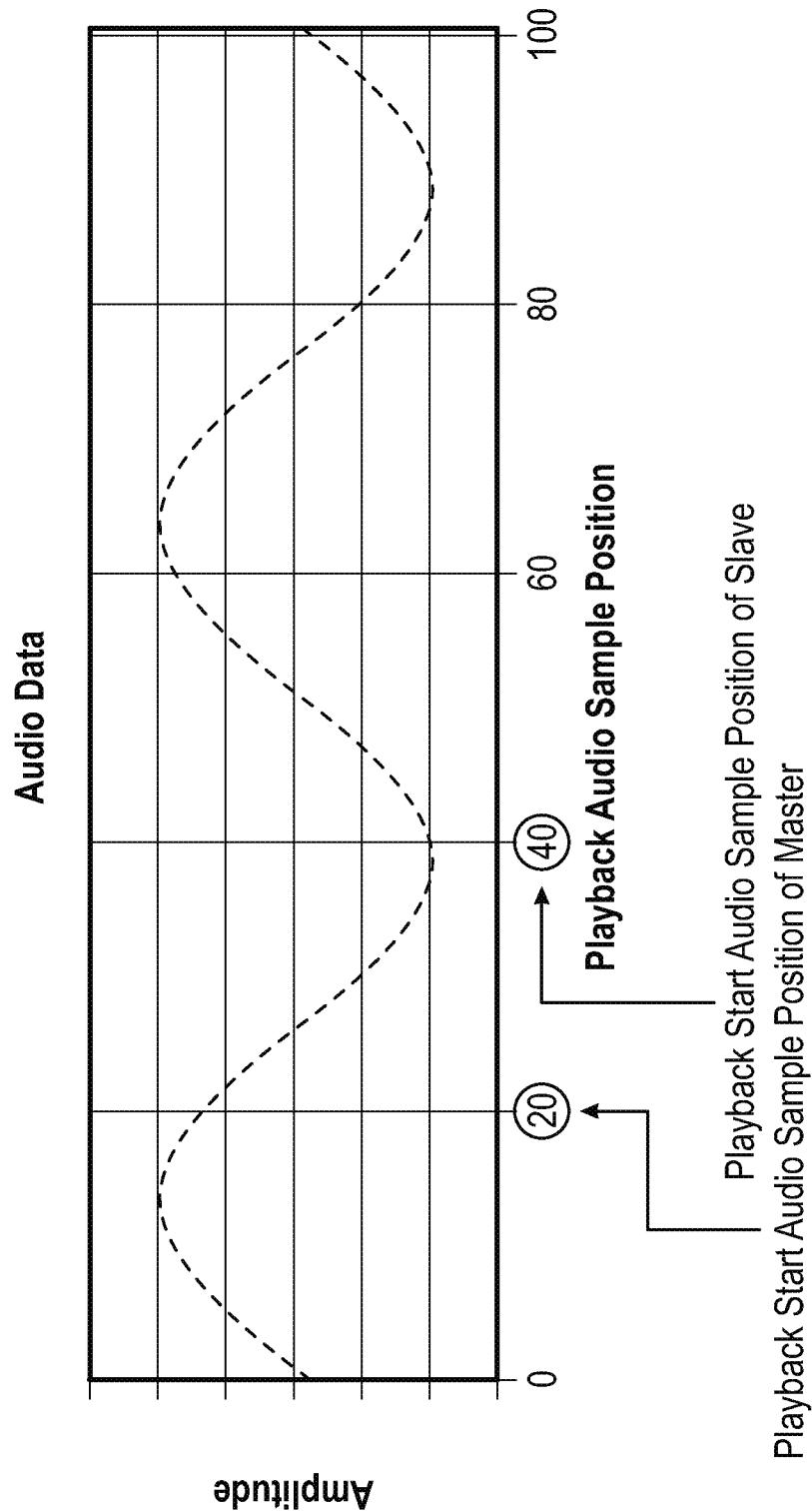
FIG. 13 is a time plot of audio data being played back by a master device and a slave device showing that the audio data is not time synchronized and the slave device is ahead in time of the master device.

The operation of various system implementations has been discussed thus far in the context of the operation of various system components. FIGS. 12-16 illustrate the operation of the system using frequency/playback graphs of the audio data over time. Referring to FIG. 12, a graph of the audio samples being played back on a master channel and slave channel implementation are illustrated by audio playback sample position. In this graph, the concentric circles around sample 20 indicate that both the master channel and the slave channel are both playing this same audio playback sample at the same time. The dotted line also indicates that both the master channel and slave channel are also aligned in time. FIG. 13 illustrates the case where the slave channel, however, at startup, begins playing sample 40 while the master channel is playing sample 20. Because of this, the methods disclosed herein will not be able to work until the starting position of the two channels is on the same audio sample. Various system and method implementations will identify this condition and reset the starting position of the two channels so that they begin on the same audio sample.

Figure 14:
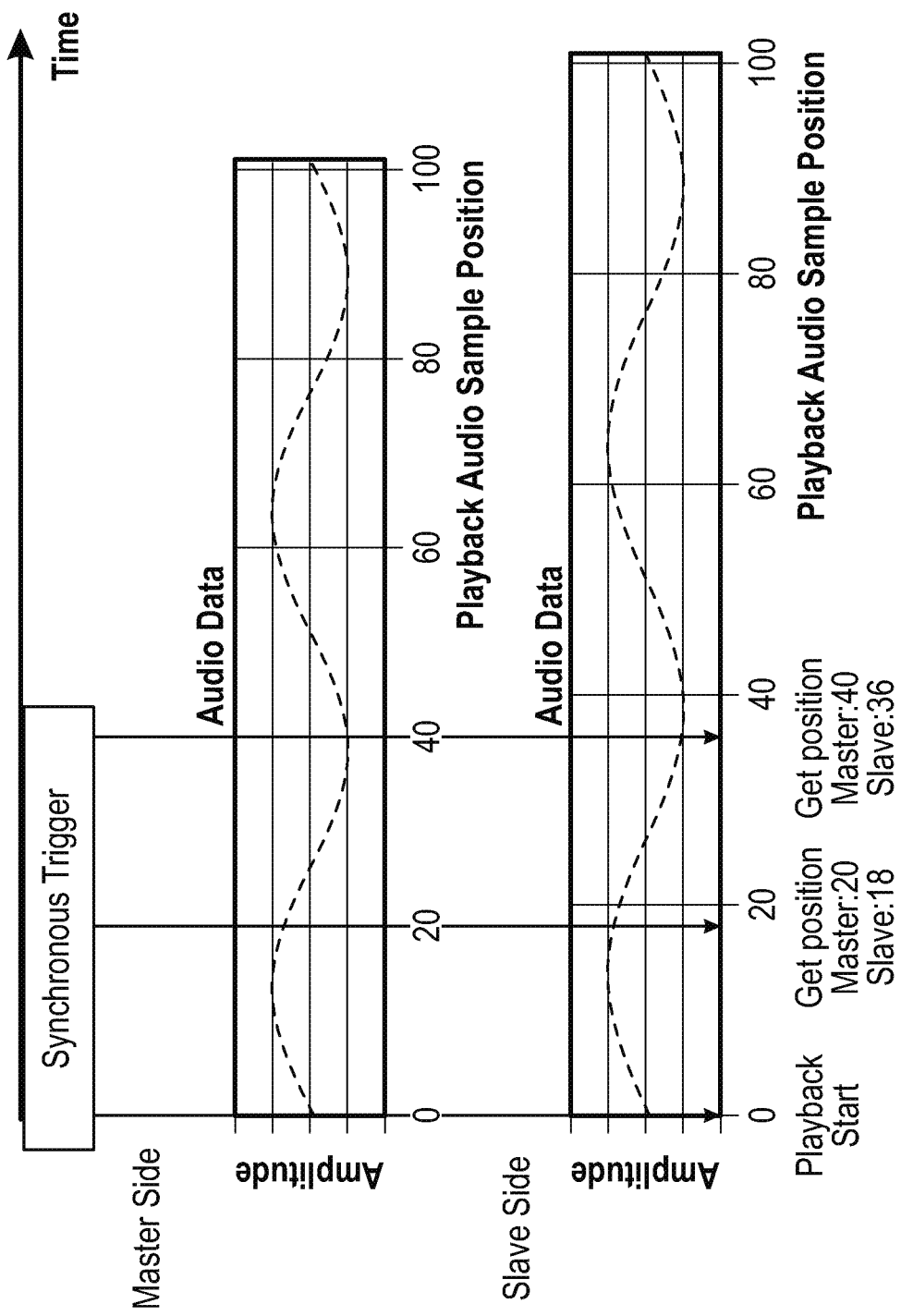
FIG. 14 is a time diagram of audio data being played back by a master device and a slave device showing the timing of a synchronous trigger.

FIG. 14 illustrates two separate graphs, one for the master channel (master side) and other for the slave channel (slave side). The time progression of the application of synchronous trigger signals from the master channel to the slave channel is also illustrated. At playback start, both the master channel and the slave channel start at playback position 0 and the first synchronous trigger signal is used by the slave channel to ensure this is the case. By the time the second synchronous trigger is received by the slave channel, the slave channel learns that it is currently playing sample 18 while the master channel is playing sample 20. By the time the third synchronous trigger is received by the slave channel, the slave channel then determines that it is playing sample 36 while the master channel is playing position 40. With this information, the slave channel can use the correction block and ASRC as disclosed herein to adjust the playback position of the slave channel to re-time synchronize the playback with that of the master channel.

Figure 15:
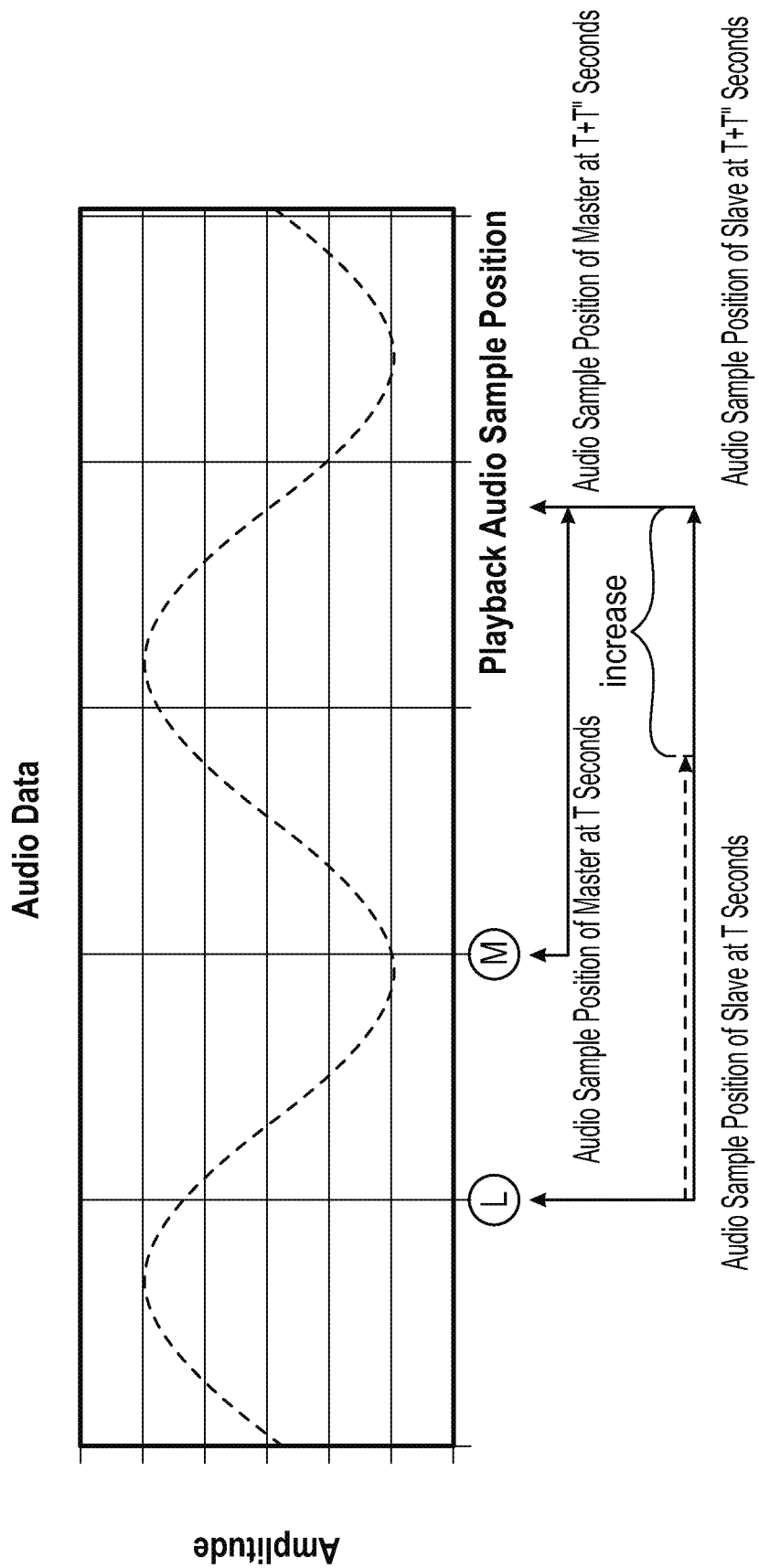
FIG. 15 is a time diagram of audio data being played back by a master device and a slave device indicating that an input sampling rate at the ASRC should be increased to allow the slave to catch up with the master.

FIG. 15 illustrates the situation where the slave channel is lagging the master channel. As described herein, at the time of the synchronization trigger, the slave channel determines using the Sample Counter that it is currently at sample position L at T seconds and that the master channel is currently at sample position M at T seconds. The Correction Block then uses this information to determine that the audio sample position of the slave channel needs to move forward in time to catch up. Accordingly, the Correction Block outputs a correction (input sampling rate, FSI, adjusted input sampling frequency, etc.) to the ASRC to enable the ASRC to change the input sampling rate of the ASRC while keeping the output rate of slave audio playback samples to the DAC the same. In this case, the input transfer rate of playback samples into the ASRC is increased. For example, if the slave sample count was 10 less than the master sample count, then the FSI may be set to 44.11 kHz by the Correction Block/ASRC. Since this is an increase of 10 samples per second, after one second the master and slave sample counts should be the same. As illustrated in FIG. 15, over the period of time T+T" seconds, the ASRC is able to catch the slave channel playback up with the playback of the master channel so that at this point, they are both playing the same sample position.

Figure 16:
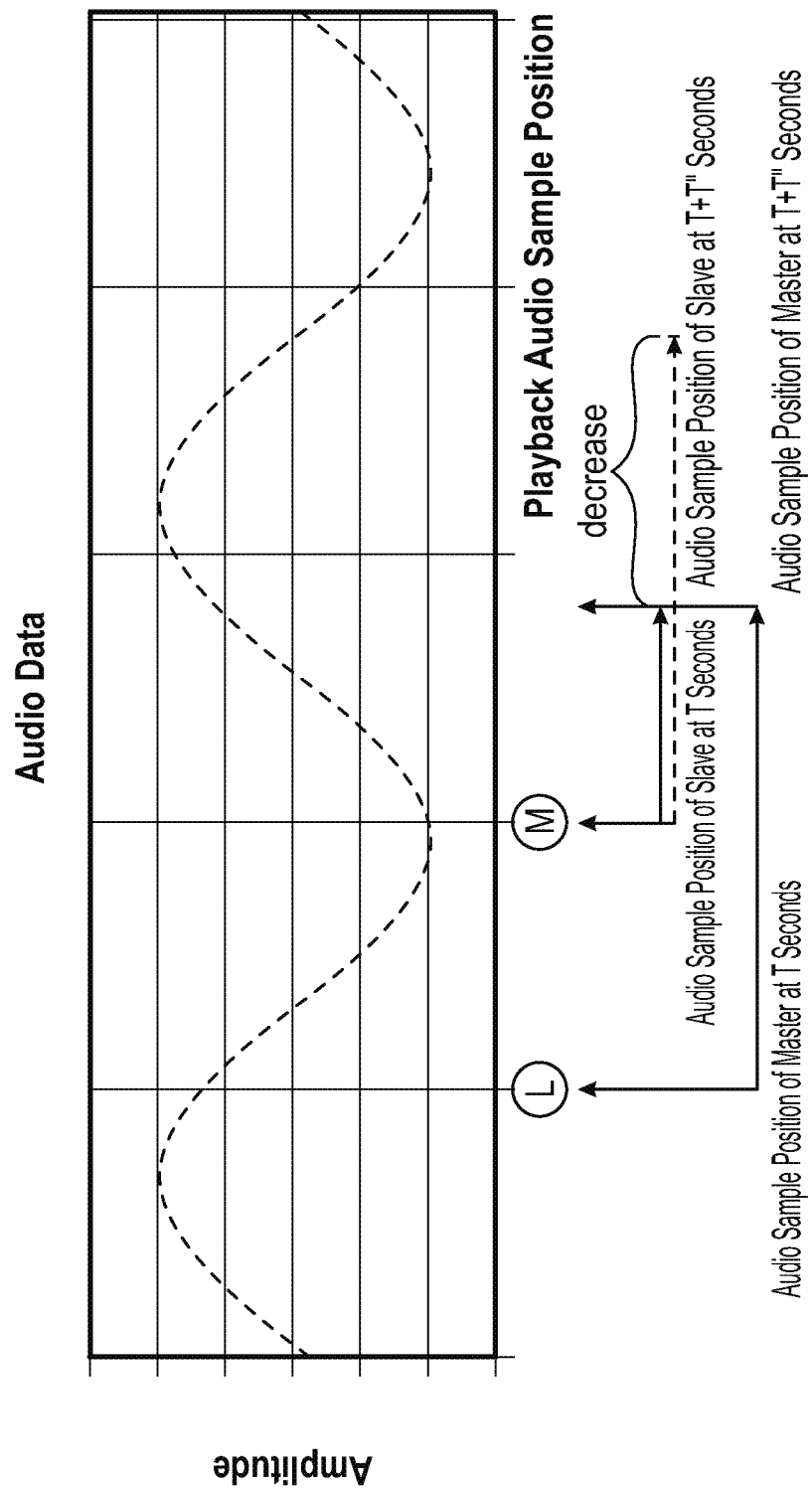
FIG. 16 is a time diagram of audio data being played back by a master device and a slave device indicating that an input sampling rate at the ASRC should be decreased to allow the slave to catch up with the master.

FIG. 16 illustrates the conversation situation, where the slave channel is ahead of the master channel. Once again, at the time of a synchronization trigger, the slave channel determines using the Sample Counter that it is currently at sample position M at T seconds, and that the master channel is currently at sample position L at T seconds. Again the Correction Block calculates and outputs a correction like those disclosed herein to the ASRC to allow it to adjust the input sample rate. In this case, the ASRC decreases the input transfer rate. For example, if the slave sample count is 10 more than the master sample count then the FSI may be set to 44.09 kHz. Since this is a decrease of 10 samples per second, after one second the master and slave sample counts should align. As illustrated in FIG. 16, over the period of time T+T" seconds, the ASRC is able to slow the slave channel playback down to the playback of the master channel.

In the various system implementations disclosed herein, the Correction Block and/or ASRC are capable of making adjustments to the input sampling rate and to instruct that the adjusted rate is to be maintained for a specific temporal duration calculated to result in realignment of the playback positions of the master and slave channels. In some implementations, however, where the offset in playback between the master channel and the slave channel remains constant or substantially constant, the Correction Block and/or ASRC may only need to make a single adjustment during the playback of audio content to synchronize the streams.

In places where the description above refers to particular implementations of synchronizing audio playback systems and implementing components, sub-components, methods and sub-methods, it should be readily apparent that a number of modifications may be made without departing from the spirit thereof and that these implementations, implementing components, sub-components, methods and sub-methods may be applied to other synchronizing audio playback systems.

What is claimed is:

1. A method of synchronizing audio playback comprising:
generating a master channel stream using a processor and a memory of a first audio speaker device, the master channel stream comprising a plurality of playback samples;
generating a slave channel stream using the master channel stream and a processor and a memory comprised in a second audio speaker device, the slave channel stream comprising a plurality of playback samples;
generating and receiving a synchronous trigger signal using the first audio speaker device;
identifying a number of master playback samples sent to a master digital-to-analog converter (DAC) in the master channel stream;
identifying a number of playback samples sent to a slave DAC converter in the slave channel stream and comparing the number of playback samples with the number of master playback samples received from a wireless telecommunication channel;
in response to receiving the synchronous trigger signal, using an asynchronous sampling rate converter (ASRC), adjusting an input transfer rate of playback samples into the ASRC.

2. The method of claim 1, wherein the input transfer rate of playback samples into the ASRC is adjusted if the number of playback samples in the slave channel stream and the number of master playback samples in the master channel stream is not the same.

3. The method of claim 1, wherein adjusting the input transfer rate of playback samples into the ASRC further comprises increasing the input transfer rate if the number of playback samples is less than the number of master playback samples.

4. The method of claim 1, wherein adjusting the input transfer rate of playback samples into the ASRC further comprises decreasing the input transfer rate if the number of playback samples is more than the number of master playback samples.

5. The method of claim 1, further comprising keeping an output transfer rate of playback samples out of the ASRC to the slave DAC at a constant value.

6. The method of claim 1, further comprising using a filter to maintain a quality of audio data comprised in the playback samples of the slave channel stream.

7. The method of claim 1, further comprising using a delay block comprised in the first audio speaker device to adjust an input transfer rate of playback samples to a master DAC comprised in the first audio speaker device to assist in time synchronizing playback of audio data comprised in the master channel stream with playback of audio data comprised in the slave channel stream.

8. The method of claim 1, further comprising adjusting the input transfer rate of playback samples into the ASRC to time synchronize playback of audio data comprised in the slave channel stream with playback of audio data comprised in the master channel stream.

9. The method of claim 1, wherein the number of playback samples sent to a slave DAC converter in the slave channel stream is identified in response to receiving the synchronous trigger signal using a wireless module of the second audio speaker device.

10. A system for synchronized audio playback comprising:
an audio playback device comprising a processor and a memory, the processor and memory configured to process audio data to generate an audio stream;

a first audio speaker device comprising a processor and a memory, the processor and memory configured to generate a master channel stream comprising a plurality of playback samples using the audio stream; and a second audio speaker device comprising a processor and a memory, the processor and memory configured to generate a slave channel stream comprising a plurality of playback samples using the master channel stream;

wherein the first audio speaker device further comprises a master sample counter configured to identify a number of master playback samples of the plurality of playback samples of the master channel stream received by a digital-to-analog converter (DAC) coupled with the processor and the memory;

wherein the second audio speaker device further comprises a second sample counter coupled with the processor and the memory and configured to identify a number of playback samples of the plurality of playback samples of the slave channel stream received by an asynchronous sampling rate converter (ASRC) coupled with the processor and the memory;

wherein in response to receiving a synchronous trigger signal sent by the first audio speaker device, the second audio speaker device is configured to compare the number of playback samples with the number of master playback samples and is configured to adjust an input transfer rate of playback samples into the ASRC.

11. The system of claim 10, further comprising a slave DAC coupled with the ASRC, wherein an output transfer rate of playback samples out of the ASRC to the slave DAC is a constant value.

12. The system of claim 10, wherein adjusting the input transfer rate of playback samples into the ASRC further comprises increasing the input transfer rate if the number of playback samples of the slave channel stream is less than the number of master playback samples.

13. The system of claim 10, wherein adjusting the input transfer rate of playback samples into the ASRC further comprises decreasing the input transfer rate if the number of playback samples of the slave channel stream is more than the number of master playback samples.

14. The system of claim 10, further comprising a correction block coupled with the ASRC and with the second sample counter, the correction block configured to calculate an adjusted input sampling frequency for the ASRC.

15. The system of claim 10, wherein the first audio speaker device further comprises a delay block configured to adjust an input transfer rate of playback samples to a master DAC comprised in the first audio speaker device to assist in time synchronizing playback of audio data comprised in the master channel stream with playback of audio data comprised in the slave channel stream.

16. The system of claim 10, wherein the adjusting of the input transfer rate of playback samples into the ASRC time synchronizes playback of audio data comprised in the slave channel stream with playback of audio data comprised in the master channel stream.

17. A method of synchronizing audio playback comprising:

using a correction block and a second sample counter, comparing a number of playback samples in a slave channel stream of a second audio speaker device with a number of master playback samples in a master channel stream received from a wireless telecommunication channel from a first audio speaker device;

using an asynchronous sampling rate converter (ASRC), adjusting an input transfer rate of playback samples and receiving an adjusted number of playback samples at the ASRC if the number of playback samples in the slave channel stream and the number of master playback samples is not the same;

keeping an output transfer rate of playback samples of the slave channel stream out of the ASRC to a slave digital-to-analog converter (DAC) at a constant value;

through adjusting the input transfer rate into the ASRC, synchronizing playback of audio data comprised in the slave channel stream with playback of audio data comprised in the master channel stream.

18. The method of claim 17, further comprising filtering to maintain a quality of the audio data comprised in the slave channel stream and filtering to maintain a quality of the audio data comprised in the master channel stream.

19. The method of claim 17, further comprising using a delay block comprised in the first audio speaker device to adjust an input transfer rate of playback samples to a master DAC comprised in the first audio speaker device to assist in time synchronizing playback of audio data comprised in the master channel stream with playback of audio data comprised in the slave channel stream.

\* \* \* \* \*